United States Patent
Chin et al.

(10) Patent No.: US 9,984,276 B2
(45) Date of Patent: May 29, 2018

(54) GROUP-VERIFICATION FINGERPRINT IDENTIFYING SYSTEM AND IDENTIFYING METHOD THEREOF

(71) Applicant: SUPERC-TOUCH CORPORATION, New Taipei (TW)

(72) Inventors: Shang Chin, New Taipei (TW); Hsiang-Yu Lee, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 38 days.

(21) Appl. No.: 15/256,565

(22) Filed: Sep. 3, 2016

(65) Prior Publication Data
US 2017/0083750 A1    Mar. 23, 2017

(30) Foreign Application Priority Data

Sep. 18, 2015   (TW) .............................. 104131054 A (51) Int. Cl.
*G06K 9/00* (2006.01)
*H04L 29/06* (2006.01)

(52) U.S. Cl.
CPC ....... *G06K 9/00087* (2013.01); *G06K 9/0002* (2013.01); *H04L 63/0861* (2013.01); *H04L 63/065* (2013.01)

(58) Field of Classification Search
USPC .................................................. 382/124–127
See application file for complete search history.

(56) References Cited

U.S. PATENT DOCUMENTS

| | | | | |
|---|---|---|---|---|
| 2002/0003892 A1* | 1/2002 | Iwanaga | ............ | G06K 9/00026 382/124 |
| 2012/0044156 A1* | 2/2012 | Michaelis | ........... | G06F 3/03547 345/173 |

FOREIGN PATENT DOCUMENTS

| | | |
|---|---|---|
| TW | 525096 B | 3/2003 |
| TW | 200828069 A | 7/2008 |
| TW | 201510776 A | 3/2015 |
| TW | M498347 U | 4/2015 |

OTHER PUBLICATIONS

Office Action dated May 16, 2016 of the corresponding Taiwan patent application.

* cited by examiner

*Primary Examiner* — Alex Liew
(74) *Attorney, Agent, or Firm* — Chun-Ming Shih; HDLS IPR Services (57) ABSTRACT

A group-verification fingerprint identifying method includes: simultaneously receiving fingerprint input operations from multiple users via a multi-finger fingerprint sensor of a fingerprint identifying apparatus for multiple fingers; generating a fingerprint combination corresponding to the fingerprint input operations; retrieving a registered fingerprints combination; generating a comparison result via comparing the fingerprints combination with the registered fingerprint combination. A more complicated verification mechanism can be provided to enhance security of identification via using group-verification and fingerprint identification.

12 Claims, 6 Drawing Sheets

GROUP-VERIFICATION FINGERPRINT IDENTIFYING SYSTEM AND IDENTIFYING METHOD THEREOF

BACKGROUND OF THE INVENTION

Field of the Invention

The present invention relates to an identifying system and method, especially to a fingerprint identifying system and method.

Description of Related Art

Biometric identifying technologies have rapid development due to the strong request from electronic security applications and automatic access control system. The biometric identifying technologies can be classified into fingerprint identifying, iris identifying and DNA identifying and so on. For the considerations of efficiency, safety and non-invasiveness, the fingerprint identifying becomes main stream technology. The fingerprint identifying device can scan fingerprint image by optical scanning, thermal imaging or capacitive imaging. For cost, power-saving, reliability and security concerns, the capacitive fingerprint sensor becomes popular for biometric identifying technology applied to portable electronic devices.

The conventional fingerprint identifying scheme only allows fingerprint identifying for single finger of single people, the safety and anti-fake function are not satisfactory. The conventional fingerprint identifying scheme lacks of complicacy such that is not suitable for authentication demanding high level of security, especially for the authentication involving national security, access control of confidential location, the activation of confidential device, the transaction of large amount of money and so on.

It is desirable to provide a more effective and complicated fingerprint identifying scheme to overcome above mentioned problems.

SUMMARY OF THE INVENTION

It is an object to provide a group-verification fingerprint identifying system and identifying method to conduct fingerprint identifying by sensing a plurality of fingerprints from multiple users at the same time.

Accordingly, the present invention provides a group-verification fingerprint identifying system comprising: a fingerprint identifying apparatus comprising: a casing; at least one multi-finger fingerprint sensor disposed on the casing and forming a sensing area for receiving input operations of multiple fingerprints from multiple users, the multi-finger fingerprint sensor generating a plurality of fingerprint data according to the input operations; and a processor electrically connected to the multi-finger fingerprint sensor and generating a fingerprint combination corresponding to the fingerprint data, the processor further obtaining a comparison result comparing the fingerprint combination and a registered fingerprint combination.

Accordingly, the present invention provides a method for group-verification fingerprint identifying, comprising: a) using at least one multi-finger fingerprint sensor of a fingerprint identifying apparatus to receive input operations of multiple fingerprints from multiple users and to generate a plurality of fingerprint data according to the input operations; and b) obtaining a fingerprint combination corresponding to the fingerprint data; c) obtaining a registered fingerprint combination; and d) generating a comparison result by comparing the fingerprint combination with the registered fingerprint combination.

By using group-verification and fingerprint identifying, the identifying scheme is advantageously complicated and the security level is enhanced.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
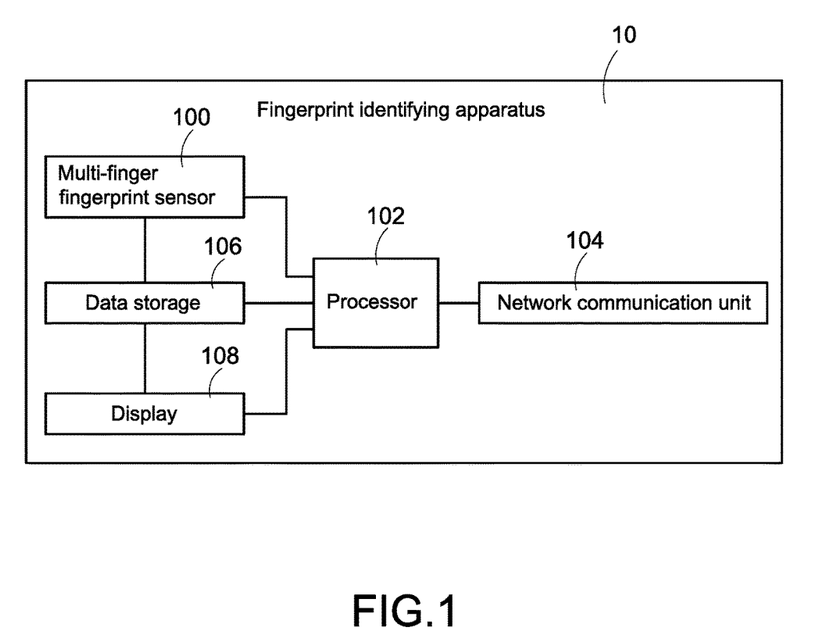
FIG. 1 shows a schematic diagram of the fingerprint identifying apparatus of the present invention.

FIG. 1 shows a schematic diagram of the fingerprint identifying apparatus of the present invention. The group-verification fingerprint identifying system (hereinafter identifying system) mainly comprises a fingerprint identifying apparatus 10. The fingerprint identifying apparatus 10 comprises at least one multi-finger fingerprint sensor 100, a network communication unit 104, a data storage 106, a display 108 and a processor 102 electrically connected to above components.

The fingerprint identifying apparatus 10 is preferably, but not limited to, a mobile electronic device such as a smart phone, a wearable computer, a laptop computer, or a panel computer. The fingerprint identifying apparatus 10 may be owned (or operated) by a single user, a plurality of users or arranged at a location commonly managed by the users (such as an entry of bank treasury, a combat command headquarter, or a nuclear power plant).

The network communication unit 104 is operatively connected to a network (such as the network 20 shown in FIG. 3) for communication with external devices. The multi-finger fingerprint sensor 100 is used to receive (simultaneously or non-simultaneously) multi-finger fingerprint input operation (for example, the uses put their finger(s) on the multi-finger fingerprint sensor 100 at the same time or individually) and the multi-finger fingerprint sensor 100 retrieves a plurality of corresponding fingerprint data. More particularly, the multi-finger fingerprint sensor 100 has a fingerprint sensing area larger than the fingerprint sensing area of conventional fingerprint sensor to allow the pressing of multiple fingers at the same time and sense the fingerprint data of multiple fingers at the same time (for example, by capacitance measurement). The fingerprint sensing area is preferably of elongated shape (such as a rectangular shape) with a side length not less than 2 centimeters.

The processor 102 is used to control the multi-finger fingerprint sensor 100. More particularly, the processor 102 can process the fingerprint data and generates a fingerprint combination corresponding to the fingerprint data (namely, corresponding to the fingerprint input operation), where the fingerprint combination comprises the fingerprint data or a plurality of characteristic data corresponding to the fingerprint data.

The processor 102 then gets a comparison result for comparing the fingerprint combination and a registered fingerprint combination, where the registered fingerprint combination is input by the user in advance and is used as comparison base in later stage. Moreover, the processor 102 may generate the comparison result by itself or get the comparison result from external device (such as a remote fingerprint data base 12 or a third party device 14 shown in FIG. 3).

Taking the processor 102 generating the comparison result by itself as an example, the data storage 106 stores the registered fingerprint combination and the processor 102 reads the registered fingerprint combination and compares them with the fingerprint combination (for example, compares the plurality of registered fingerprint data in the registered fingerprint combination with the plurality of fingerprint data in the fingerprint combination). The processor 102 generates a comparison result of "authentication success" when the fingerprint data are the same as or very similar to the registered fingerprint data. The processor 102 generates a comparison result of "authentication failure" when the fingerprint data are completely different to or partially different to the registered fingerprint data.

Finally, the processor 102 outputs the comparison result (for example, displays the comparison result on the display 108) and then performs corresponding control based on the comparison result. For example, the processor 102 may automatically open a door, turn on/off a security device or confirm an important transaction when the comparison result is authentication success. The processor 102 may issue alert when the comparison result is authentication failure.

According to another embodiment, the registered fingerprint combination may further comprise a registered appendix datum and the processor 102 may generate an appendix datum before generating the fingerprint combination and add the appendix datum in the fingerprint combination. The processor 102 (or an external device) may compare the appendix datum with the registered appendix datum and determine that the comparison result is authentication success when the appendix datum is also matched with the registered appendix datum and vice versa. This embodiment provides an enhanced safety for fingerprint authentication.

Preferably the registered appendix datum may record input sequences, input locations or input time points for the registered fingerprint data. The appendix datum may record input sequences, input locations or input time points for the fingerprint data.

According to another embodiment, the registered appendix datum and the appendix datum may be used for a second authentication mechanism. The registered appendix datum stores identification codes, identification icons or other identification information preset by the users. During authentication, the fingerprint identifying apparatus 10 may compare user-input identification codes (such as input passwords), user-input identification icons (such as unlock icons) or other user-input identification information (such as accessing card) with the registered appendix datum for identification. Therefore, the second authentication mechanism can enhance the security for user authentication.

Figure 2A:
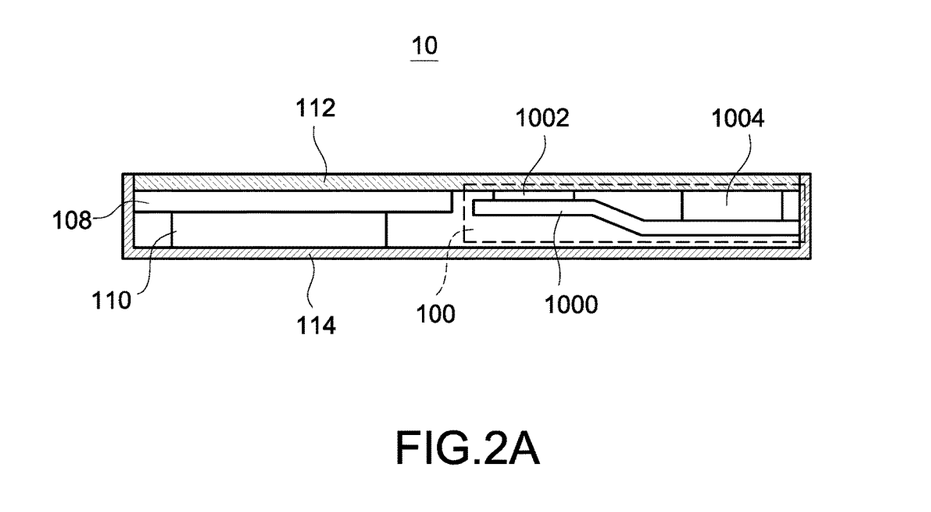
FIG. 2A shows a sectional view of the fingerprint identifying apparatus according to an embodiment of the present invention.

With reference to FIG. 2A, which shows a sectional view of the fingerprint identifying apparatus 10 according to an embodiment of the present invention; the fingerprint identifying apparatus 10 comprises a device circuit 110 and a casing. The casing comprises an upper casing 112 and a lower casing 114. The processor 102 is electrically connected to the device circuit 110 and controls the fingerprint identifying apparatus 10 through the device circuit 110. The upper casing 112 and the lower casing 114 together encapsulate other components of the fingerprint identifying apparatus 10 to provide protection for those components. Preferably the upper casing 112 further comprises a protection layer, which may be made of transparent glass. The lower casing 114 may comprise another protection layer, which may be made of non-transparent material.

The multi-finger fingerprint sensor 100 will be detailed with a preferred embodiment thereof. The multi-finger fingerprint sensor 100 further comprises a substrate 1000, a sensing element 1002 for generating the fingerprint data and a sensing device 1004.

The substrate 1000 may be, for example but not limited to, a polymer substrate, a glass substrate, or a metal substrate. The sensing element 1002 is arranged on one side surface of the substrate 1000 and disposed on (or in proximity to) the upper casing 112 such that a sensing area (namely, the area atop the sensing element 1002) can be provided on the on the upper casing 112. Preferably the multi-finger fingerprint sensor 100 is a self-capacitance fingerprint sensor, which is constituted by sensing electrodes, and generates a sensing signal corresponding to fingerprint input operation such as a signal or a fingerprint image corresponding to capacitance change. The sensing element 1002 is disposed on or in proximity to the protection layer of the upper casing 112 to provide fingerprint sensing operation for user finger touching to or in proximity to the upper casing 112.

In this embodiment, the sensing element 1002 may be disposed on (or in proximity to) the upper casing 112; however, in another embodiment, the sensing element 1002 may be disposed on (or in proximity to) the lower casing 114.

The sensing device 1004 is electrically connected to the sensing element 1002 and preferably arranged on the side surface of the substrate 1000; the sensing device 1004 is also disposed on (or in proximity to) the upper casing 112. The sensing device 1004 is used to identify the minute stray capacitance change generated by the sensing element 1002 and is preferably a sensing device for minute impedance change.

The display 108 is disposed on (or in proximity to) the protection layer of the upper casing 112 to form a display area (namely the area atop the display 108) on the protection layer of the upper casing 112. Preferably the sensing area is outside the display area, namely the sensing element 1002 is not overlapped with the display 108 from top view.

Figure 2B:
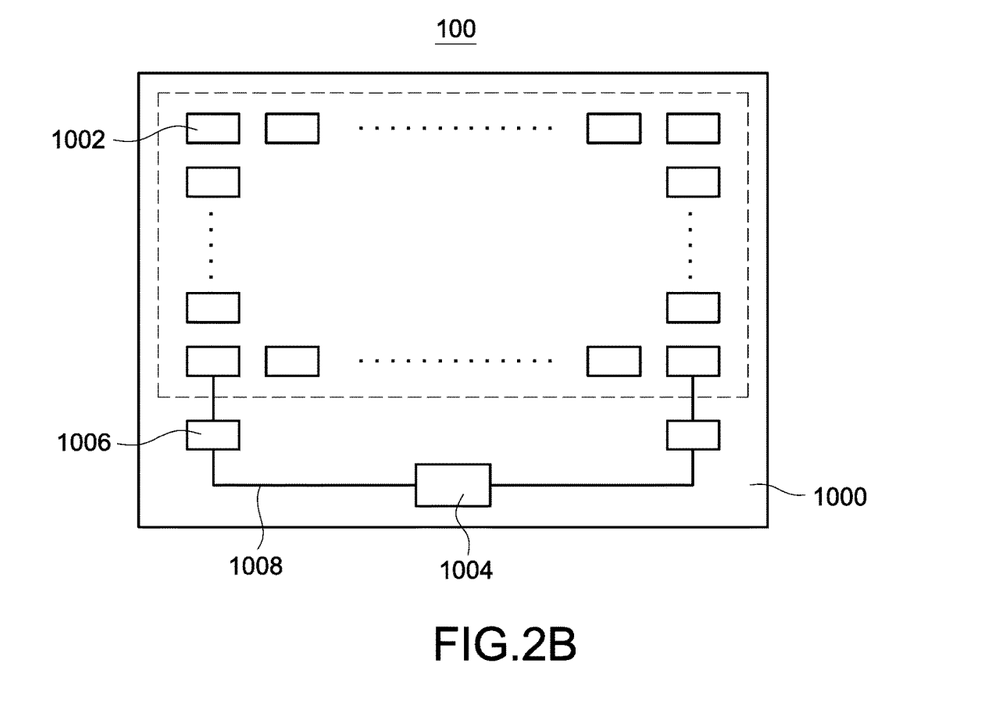
FIG. 2B shows a schematic view of the multi-finger fingerprint sensor according to one embodiment of the present invention.

With reference also to FIG. 2B, which shows a schematic view of the multi-finger fingerprint sensor 100 according to one embodiment of the present invention, the multi-finger fingerprint sensor 100 may comprise a plurality of sensing elements 1002 (namely sensing electrodes). Each of the sensing elements 1002 provides a sub sensing area and the sensing elements 1002 together provide the sensing area as shown by dashed box in FIG. 2B. Preferably, each of the sensing electrodes may be made from conductive metal material, which is selected from the group consisted of: chromium (Cr), barium (Ba), aluminum (Al), silver (Ag), copper (Cu), titanium (Ti), nickel (Ni), tantalum (Ta), cobalt (Co), tungsten (W), magnesium (Mg), calcium (Ca), potassium (K), lithium (Li), indium (In), an alloy of above metals. The selection switch 1006 may be thin film transistor switch or CMOS transistor switch.

Moreover, the multi-finger fingerprint sensor 100 further comprises a plurality of selection switches 1006 and a plurality of conductive wires 1008 arranged on the substrate 1000 and electrically connected to the sensing device 1004. The selection switches 1006 are electrically connected to the corresponding sensing elements 1002 through the conductive wires 1008.

The sensing device 1004 selectively receives the sensing signal from one or more sensing elements 1002 through the selection switches 1006 and the conductive wires 1008 and then generates the fingerprint data. More particularly, by controlling the on/off state of the selection switches 1006 to change, enable or disable a transmission path of the sensing signal from the specific (selected) sensing element(s) 1002, the sensing device 1004 can obtain the sensing signal from a specific (selected) sensing element 1002.

The mutual interference between the sensing elements 1002 (sensing electrodes) can be overcome by the technology disclosed in Taiwan patent application No. 103213948, filed in Aug. 6, 2014 by the same applicant, and the technology disclosed in Taiwan patent application No. 103215145, filed in Aug. 25, 2014 by the same applicant. Part of the disclosure is described below.

Each of the selection switches 1006 comprises at least one data output selection element and at least one reference-voltage selection element (not shown) corresponding to the data output selection element, where each of the data output selection elements is corresponding to one sensing element 1002 and each of the reference-voltage selection elements is corresponding to one sensing element 1002.

Each of the conductive wires 1008 comprises at least one data output selection wire segment and at least one reference-voltage selection wire segment corresponding to the data output selection wire segment (not shown), where each of the data output selection wire segments is corresponding to one data output selection element and each of the reference-voltage selection wire segments is corresponding to one reference-voltage selection element.

A first end of each data output selection element is electrically connected to the corresponding sensing element 1002 and a second end of each data output selection element is electrically connected to the corresponding data output selection wire segment. A first end of each reference-voltage selection element is electrically connected to the first end of the corresponding data output selection element and a second end of each reference-voltage selection element is electrically connected to the corresponding reference-voltage selection wire segment.

The sensing device (such as a controller) 1004 controls the sensing of each sensing element 1002 (namely enabling the sub sensing area formed by the sensing element 1002) by controlling the data output selection element, the reference-voltage selection element, the data output selection wire segment and the reference-voltage selection wire segment. Namely, the sensing device 1004 can enable the sub sensing area formed by the sensing element 1002 to perform sensing or disable the sub sensing area formed by the sensing element 1002 to stop sensing and the sensing device 1004 can control the signal transmission path for the sensing signals.

By using the sensing device 1004 to control the sensing for each sensing element 1002 and the signal transmission path for the sensing signals, the mutual interference between the sensing elements can be prevented.

Figure 3:
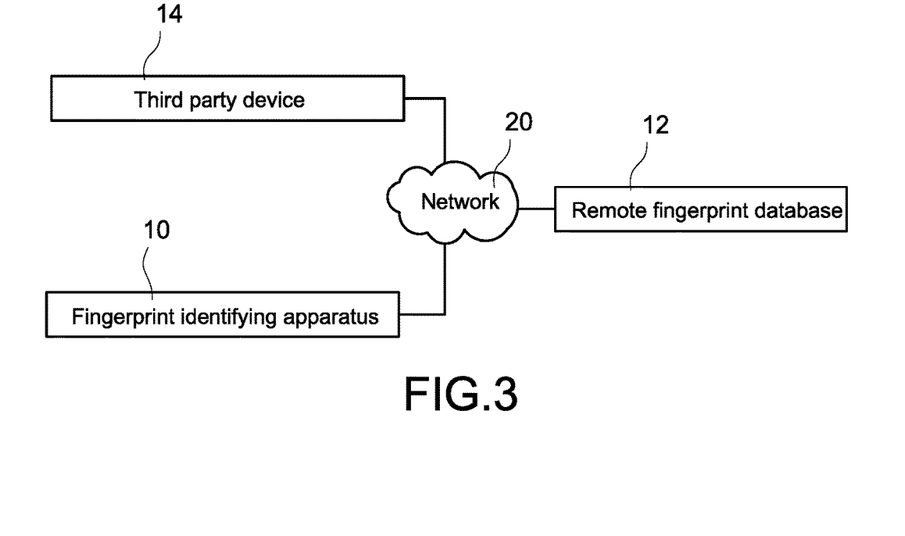
FIG. 3 shows a system view of the group-verification fingerprint identifying system according to an embodiment of the present invention.

FIG. 3 shows a system view of the group-verification fingerprint identifying system according to an embodiment of the present invention. This drawing depicts how the processor 102 receives the comparison result from external device. The identifying system further comprises a remote fingerprint database 12 operatively connected to a network 20, for example, a wired LAN, a wireless LAN (such as Bluetooth network or Ether network) or Internet, where the remote fingerprint database 12 stores the registered fingerprint combination.

In this embodiment, the identifying system provide a remote authentication mechanism, the fingerprint identifying apparatus 10 may send the fingerprint combination to the remote fingerprint database 12 through the network 20. The remote fingerprint database 12 reads pre-stored registered fingerprint data and compares the fingerprint combination with the registered fingerprint data and then generates the comparison result. The fingerprint database 12 sends the comparison result to the fingerprint identifying apparatus 10 through the network 20. Preferably, the fingerprint identifying apparatus 10 and the remote fingerprint database 12 transmit above data through encrypted scheme, for example, SSL encryption/decryption or key encryption/decryption. The authentication of the present invention can be enhanced because the comparison for the fingerprint combination is conducted by the remote fingerprint database 12.

In another embodiment, the identifying system further provides a third party authentication mechanism. More particularly, the identifying system further comprises a third party device 14 operatively connected to the network 20. The fingerprint identifying apparatus 10 may send the fingerprint combination to the third party device 14 through the network 20. The remote fingerprint database 12 sends the registered fingerprint data to the third party device 14 through the network 20. The third party device 14 sends the comparison result to the fingerprint identifying apparatus 10 for completing the authentication after the third party device 14 compares the fingerprint combination with the registered fingerprint data to generate the comparison result. Besides, the third party device 14 can also send the comparison result to the remote fingerprint database 12 such that the remote fingerprint database 12 may store a record for this comparison.

In another embodiment, the identifying system further provides a distributed authentication mechanism. More particularly, the registered fingerprint combination is distributed into a plurality of devices and the comparison between the fingerprint combination and the registered fingerprint combination are conducted by the plurality of devices.

For example, the remote fingerprint database 12 may store a first part of the registered fingerprint combination (for example, a half portion or a whole portion of the registered fingerprint data), and the fingerprint identifying apparatus 10 stores a second part of the registered fingerprint combination (for example, the other half part of the registered fingerprint data or the registered appendix datum). The fingerprint identifying apparatus 10 may separate the fetched fingerprint combination into a first part and a second part in a way similar to the separated registered fingerprint combination and then send the first part of the fingerprint combination to the remote fingerprint database 12.

Afterward, the remote fingerprint database 12 compares the first part of the fingerprint combination and the first part of the registered fingerprint combination, generates a first comparison result and sends the first comparison result to the third party device 14. The fingerprint identifying apparatus 10 compares the second part of the fingerprint combination and the second part of the registered fingerprint combination, generates a second comparison result and sends the second comparison result to the third party device 14. The third party device 14 generates the comparison result based on the first comparison result and the second comparison result, and then sends the comparison result to the fingerprint identifying apparatus 10 and/or the remote fingerprint database 12.

In above example, the registered fingerprint combination is distributed in the fingerprint identifying apparatus 10 and the remote fingerprint database 12 and the third party device 14 is only in charge of generating the final comparison result. In another embodiment, the fingerprint identifying apparatus 10, the remote fingerprint database 12 and the third party device 14 respectively stores a partial portion of the registered fingerprint combination and fetches the respective part of the fingerprint combination. The fingerprint identifying apparatus 10, the remote fingerprint database 12 and the third party device 14 respectively generates a first comparison result, a second comparison result and a third comparison result after respective identifying operation. The first comparison result, the second comparison result and the third comparison result are then sent to a specific device (such as the third party device 14) for generating the final comparison result.

The fingerprint identifying apparatus 10, the remote fingerprint database 12 and the third party device 14 preferably send data to each other through encrypted scheme, for example, SSL encryption/decryption or key encryption/decryption.

Moreover, the third party device 14 is an organization or manager independent to the users and the provider of the remote fingerprint database 12. The third party device 14 is prestigious and trusted by the users and the provider of the remote fingerprint database 12. By the third party authentication mechanism (namely, the comparison result is generated by an independent third party device 14), the comparison result can be prevented from tampering or counterfeiting, thus enhancing the safety and credibility of the authentication.

Figure 4:
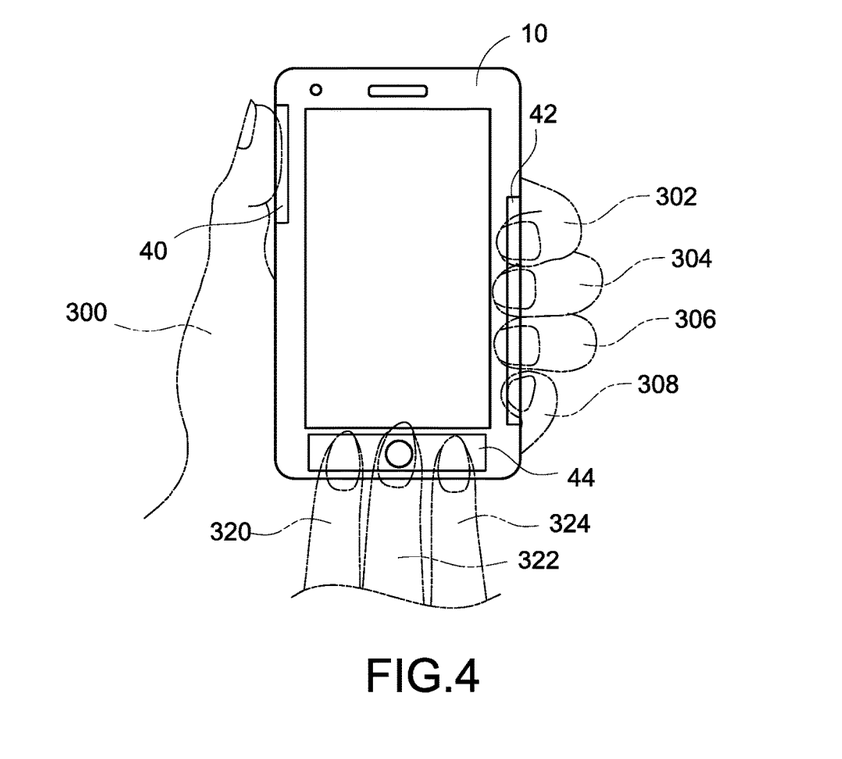
FIG. 4 is a schematic view for illustrating the fingerprint input operation for users.

FIG. 4 is a schematic view for illustrating the fingerprint input operation for users. In this drawings, the fingerprint identifying apparatus 10 is a mobile electronic device and has a plurality of multi-finger fingerprint sensor 100 to form a plurality of corresponding sensing areas, where the present invention is exemplified with three sensing areas, namely the first sensing area 40, a second sensing area 42 and a third sensing area 44.

A first user may press his thumb 300 on the first sensing area 40 to conduct a first fingerprint input operation and press the remaining four fingers 302-308 of his operating hand on the second sensing area 42 to conduct a second fingerprint input operation. At the same time, a second user may press his three fingers 320-324 on the third sensing area 44 to conduct a third fingerprint input operation.

The fingerprint identifying apparatus 10 may sequentially or simultaneously obtain the fingerprints from the thumb 300 and the remaining four fingers 302-308 of the first user and the three fingers 320-324 of the second user to constitute the fingerprint combination. Moreover, the fingerprint identifying apparatus 10 may generate the appendix datum according the sensed finger number or the pressing order on the first sensing area 40, the second sensing area 42 and the third sensing area 44.

According to another embodiment of the present invention, the fingerprint identifying apparatus 10 may have another multi-finger fingerprint sensor 100 on backside thereof to provide a fourth sensing area (not shown). The palm of the first user may press on the fourth sensing area to conduct a palm print sensing when he presses his hand on the first sensing area 40 and the second sensing area 42. The fingerprint identifying apparatus 10 may integrate the palm print into the fingerprint combination (the processing of the palm print is similar to that of the fingerprint and the detailed description is omitted here).

Figure 5:
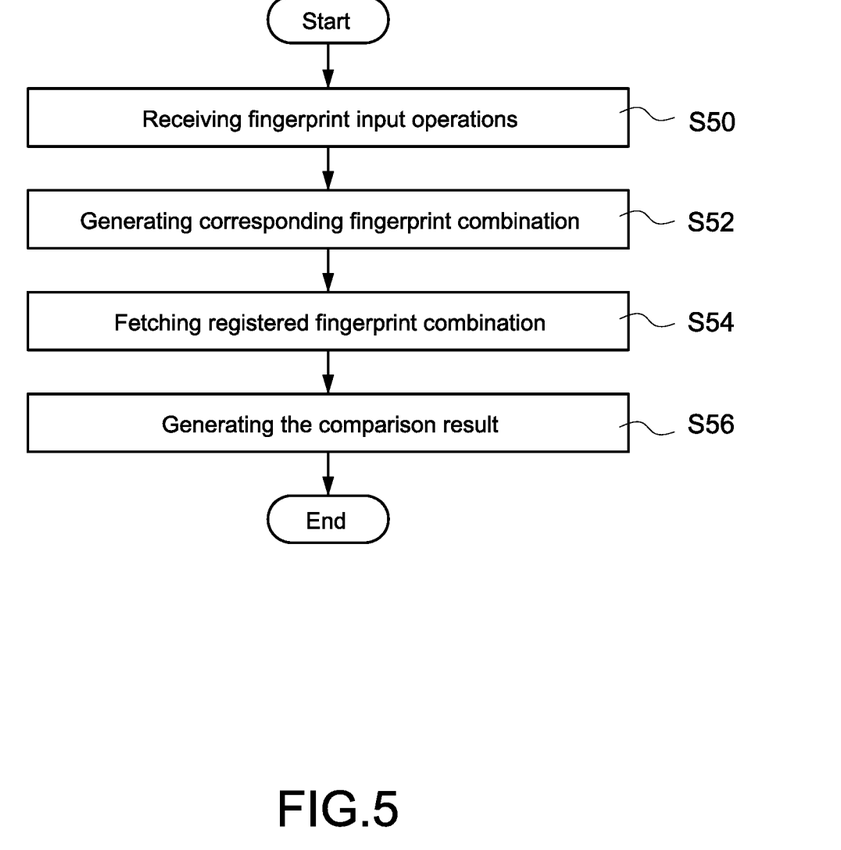
FIG. 5 shows the flowchart of the method for group-verification fingerprint identifying according to the first embodiment of the present invention.

FIG. 5 shows the flowchart of the method for group-verification fingerprint identifying according to the first embodiment of the present invention. The method shown in FIG. 5 may be implemented by the identifying system shown in FIGS. 1 to 3. The method shown in FIG. 5 comprises following steps:

Step S50: The fingerprint identifying apparatus 10 simultaneously receives the fingerprint input operations of the users through the multi-finger fingerprint sensor 100.

Step S52: The fingerprint identifying apparatus 10 generates a fingerprint combination according to the received fingerprint input operations.

Step S54: Fetching the registered fingerprint combination. Preferably, the registered fingerprint combination is stored in the data storage 106 built in the fingerprint identifying apparatus 10, stored in the remote fingerprint database 12, or stored in the data storage 106, the remote fingerprint database 12 and/or the third party device 14 in distributed manner.

Step S56: Generating the comparison result by comparing the fingerprint combination with the registered fingerprint combination. Preferably, the fingerprint identifying apparatus 10, the remote fingerprint database 12 and/or the third party device 14 generates the comparison result by comparing the fingerprint combination with the registered fingerprint combination.

Afterward, the fingerprint identifying apparatus 10 outputs the comparison result and conducts corresponding control operation based on the comparison result.

According to another embodiment of the present invention, the fingerprint combination comprises the fingerprint data and the appendix data, the registered fingerprint combination comprises the registered fingerprint data and the registered appendix data.

Moreover, in the step S50 the appendix datum is generated. In the step S56, the comparison result is generated by comparing the fingerprint data and the registered fingerprint data and comparing the appendix datum and the registered appendix datum.

Preferably, the registered appendix datum may record input sequences, input locations or input time points for the registered fingerprint data. The appendix datum may record input sequences, input locations or input time points for the fingerprint data.

According to another embodiment, the registered appendix datum and the appendix datum are used for the second authentication mechanism. More particularly, the registered appendix datum may store the identification codes, the identification icons or other identification information preset by the users. Moreover, a step can be performed before the step S50: receiving the identification codes, the identification icons or other identification information input by the users. The step S50 uses the identification codes, the identification icons or other identification information as appendix datum for authentication.

By comparing the fingerprint data and the appendix datum, the security for the authentication can be enhanced.

Figure 6:
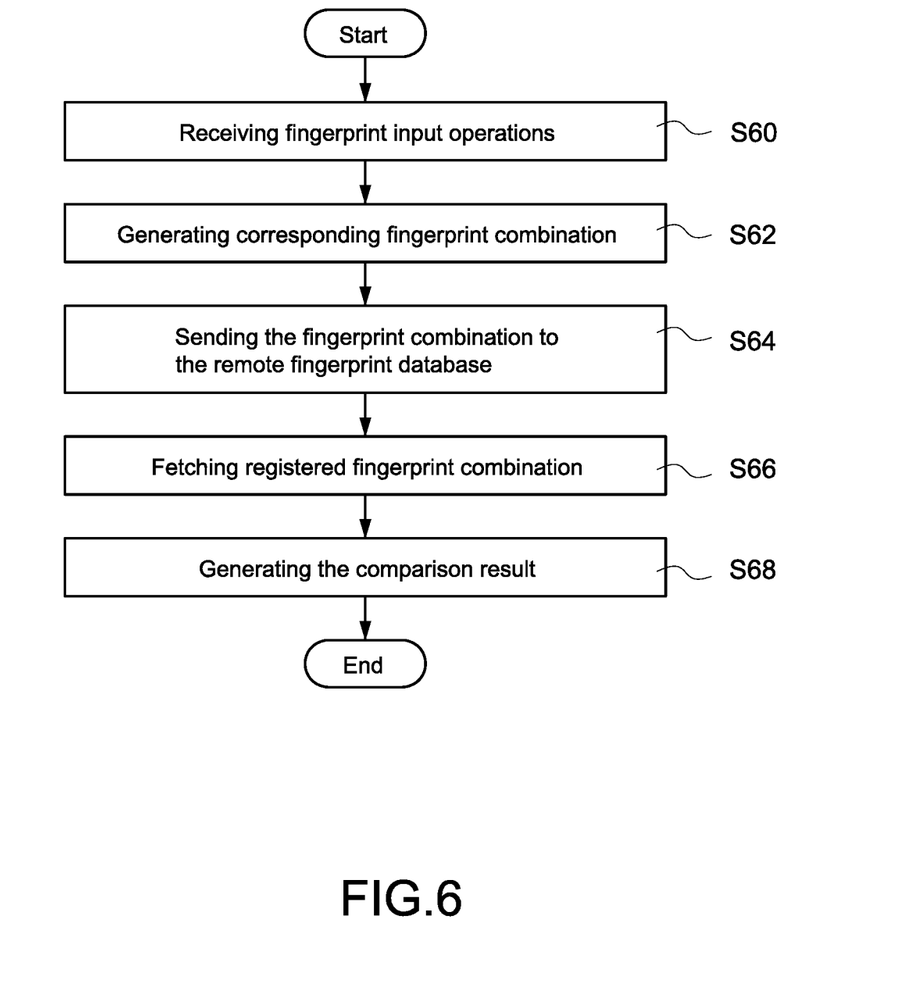
FIG. 6 shows the flowchart of the method for group-verification fingerprint identifying according to the second embodiment of the present invention.

FIG. 6 shows the flowchart of the method for group-verification fingerprint identifying according to the second embodiment of the present invention. The method shown in FIG. 6 may be implemented by the identifying system shown in FIGS. 1 to 3. The method shown in FIG. 6 comprises following steps:

Step S60: The fingerprint identifying apparatus 10 receives the fingerprint input operations.

Step S62: The fingerprint identifying apparatus 10 generates a fingerprint combination according to the received fingerprint input operations.

Step S64: The fingerprint identifying apparatus 10 sends the fingerprint combination to a remote fingerprint database 12 with data encryption.

Step S66: The remote fingerprint database 12 fetches the pre-stored registered fingerprint combination.

Step S68: The remote fingerprint database 12 compares the fingerprint combination and the registered fingerprint combination and generates a comparison result. The remote fingerprint database 12 sends the comparison result to the fingerprint identifying apparatus 10.

Figure 7:
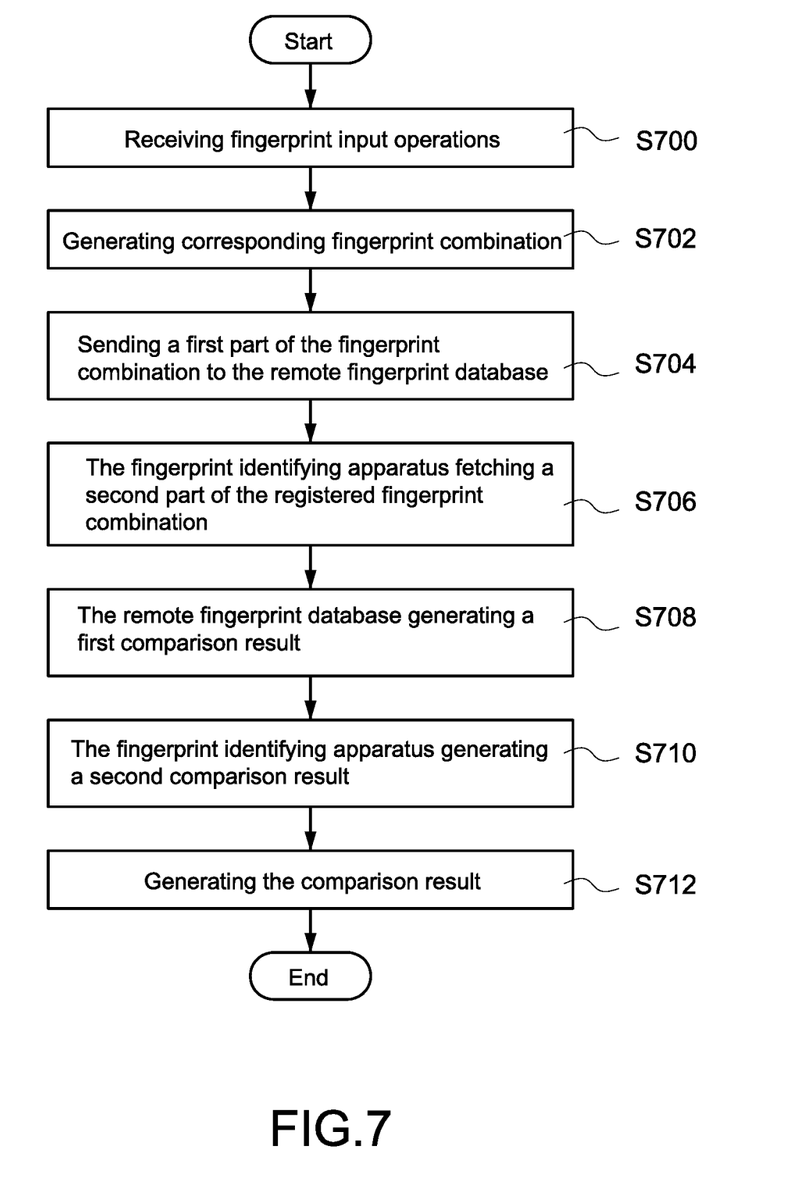
FIG. 7 shows the flowchart of the method for group-verification fingerprint identifying according to the third embodiment of the present invention.

FIG. 7 shows the flowchart of the method for group-verification fingerprint identifying according to the third embodiment of the present invention. The method shown in FIG. 7 may be implemented by the identifying system shown in FIGS. 1 to 3. The method shown in FIG. 7 comprises following steps:

Step S70: The fingerprint identifying apparatus 10 receives the fingerprint input operations.

Step S702: The fingerprint identifying apparatus 10 generates a fingerprint combination according to the received fingerprint input operations.

Step S704: The fingerprint identifying apparatus 10 separates the fingerprint combination into a first part and a second part, and then sends the first part of the fingerprint combination to the remote fingerprint database 12 with data encryption.

Step S706: The fingerprint identifying apparatus 10 reads the second part of the registered fingerprint combination from the data storage 106 or receives the second part of the registered fingerprint combination from the remote fingerprint database 12 with data encryption.

Step S708: The remote fingerprint database 12 generates a first comparison result by comparing the first part of the registered fingerprint combination and the first part of the received fingerprint combination.

According to another embodiment, the remote fingerprint database 12 further sends the first comparison result to the third party device 14 with data encryption.

Step S710: The fingerprint identifying apparatus 10 generates a second comparison result by comparing the second part of the registered fingerprint combination and the second part of the fingerprint combination.

According to another embodiment, the fingerprint identifying apparatus 10 sends the second comparison result to the third party device 14 with data encryption.

Step S712: The third party device 14 generates the comparison result based on the first comparison result and the second comparison result, and the third party device 14 sends the comparison result to the fingerprint identifying apparatus 10 to complete the authentication.

It should be noted that the final comparison result may be generated by the fingerprint identifying apparatus 10 or the remote fingerprint database 12 instead of the third party device 14.

By the group-verification fingerprint identifying, the authentication can be more secure.

Thus, particular embodiments have been described. Other embodiments are within the scope of the following claims. For example, the actions recited in the claims may be performed in a different order and still achieve desirable results.

What is claimed is:

1. A group-verification fingerprint identifying system comprising:
a remote fingerprint database operatively connected to a network and storing a first part of a registered fingerprint combination, the remote fingerprint database is configured to fetches a first part of a fingerprint combination and generate a first comparison result by comparing the first part of the fingerprint combination and the first part of the registered fingerprint combination; and
a fingerprint identifying apparatus comprising:
a casing;
at least one multi-finger fingerprint sensor disposed on the casing and forming a sensing area for receiving input operations of multiple fingerprints from multiple users, the multi-finger fingerprint sensor generating a plurality of fingerprint data according to the input operations;
a network communication unit operatively connected to the remote fingerprint database through the network;
a data storage for storing a second part of the registered fingerprint combination; and
a processor electrically connected to the network communication unit, the data storage and the multi-finger fingerprint sensor, the processor being configured to generate the fingerprint combination corresponding to the fingerprint data, the processor further obtaining a first comparison result comparing the fingerprint combination and a registered fingerprint combination, a second comparison result being generated by comparing the second part of the fingerprint combination and the second part of the registered fingerprint combination, and a comparison result corresponding to the first comparison result and the second comparison result being obtained.

2. The group-verification fingerprint identifying system in claim 1, further comprising a third party device operatively connected to the remote fingerprint database and the fingerprint identifying apparatus through the network, the third party device receives the first comparison result and the second comparison result respectively from the remote fingerprint database and the fingerprint identifying apparatus and is configured to generate the comparison result corresponding to the first comparison result and the second comparison result and send the comparison result to the fingerprint identifying apparatus.

3. The group-verification fingerprint identifying system in claim 2, wherein the fingerprint identifying apparatus sends the first part of the fingerprint combination to the remote fingerprint database with data encryption and sends the second comparison result to the third party device with data encryption; the remote fingerprint database sends the first comparison result to the third party device with data encryption; and the third party device sends the comparison result to the fingerprint identifying apparatus with data encryption.

4. The group-verification fingerprint identifying system in claim 1, wherein the fingerprint identifying apparatus is a mobile electronic device.

5. The group-verification fingerprint identifying system in claim 1, further comprising a display electrically connected to the processor, the sensing area of the multi-finger fingerprint sensor is outside a display area of the display.

6. The group-verification fingerprint identifying system in claim 1, wherein a side length of the sensing area of the multi-finger fingerprint sensor is not less than two centimeters.

7. A method for group-verification fingerprint identifying, comprising:
   a) using at least one multi-finger fingerprint sensor of a fingerprint identifying apparatus to receive input operations of multiple fingerprints from multiple users and to generate a plurality of fingerprint data according to the input operations; and
   b) obtaining a fingerprint combination corresponding to the fingerprint data, and sending a first part of the fingerprint combination to a remote fingerprint database;
   c) generating a first comparison result by comparing the first part of the fingerprint combination and a first part of a registered fingerprint combination at the remote fingerprint database;
   d) generating a second comparison result by comparing a second part of the fingerprint combination and a second part of the registered fingerprint combination; and
   e) generating a comparison result corresponding to the first comparison result and the second comparison result.

8. The method for group-verification fingerprint identifying in claim 7, further comprising a step f) after the step c): the remote fingerprint database sending the first comparison result to a third party device, and comprising a step g) after the step d): the fingerprint identifying apparatus sending the second comparison result to the third party device; wherein in the step e) the third party device generates the comparison result corresponding to the first comparison result and the second comparison result.

9. The method for group-verification fingerprint identifying in claim 8, wherein the fingerprint identifying apparatus sends the first part of the fingerprint combination to the remote fingerprint database with data encryption and sends the second comparison result to the third party device with data encryption; the remote fingerprint database sends the first comparison result to the third party device with data encryption; and the third party device sends the comparison result to the fingerprint identifying apparatus with data encryption.

10. The method for group-verification fingerprint identifying in claim 7, wherein the fingerprint combination comprises the fingerprint data and an appendix datum, the registered fingerprint combination comprises the registered fingerprint data and a registered appendix datum; wherein the first part of the fingerprint combination comprises a half portion or a whole portion of the fingerprint data, the second part of the fingerprint combination comprises the other half part of the fingerprint data or the appendix datum; the first part of the registered fingerprint combination comprises a half portion or a whole portion of the registered fingerprint data, the second part of the registered fingerprint combination comprises the other half part of the registered fingerprint data or the registered appendix datum.

11. The method for group-verification fingerprint identifying in claim 10, wherein the registered appendix datum records input sequences, input locations or input time points for the registered fingerprint data, the appendix datum records input sequences, input locations or input time points for the fingerprint data.

12. The method for group-verification fingerprint identifying in claim 10, wherein the registered appendix datum records an identification code, an identification icon or an identification information preset by the users, wherein a step a1 is performed before the step a): receiving an identification code, an identification icon or an identification information from the users; wherein in the step a) the received identification code, identification icon or identification information is used as the appendix datum.

* * * * *